(12) United States Patent
Tanaka

(10) Patent No.: US 12,226,986 B2
(45) Date of Patent: Feb. 18, 2025

(54) CORE MATERIAL AND STRUCTURE

(71) Applicants: Adtec Engineering Co., Ltd., Tokyo (JP); Suzuki Industry Co., Ltd., Gifu (JP)

(72) Inventor: Yoneta Tanaka, Tokyo (JP)

(73) Assignees: Adtec Engineering Co., Ltd., Tokyo (JP); Suzuki Industry Co., Ltd., Gifu (JP)

( * ) Notice: Subject to any disclaimer, the term of this patent is extended or adjusted under 35 U.S.C. 154(b) by 323 days.

(21) Appl. No.: 17/756,026

(22) PCT Filed: Jul. 29, 2020

(86) PCT No.: PCT/JP2020/029075
§ 371 (c)(1),
(2) Date: May 13, 2022

(87) PCT Pub. No.: WO2021/095303
PCT Pub. Date: May 20, 2021

(65) Prior Publication Data
US 2022/0396049 A1    Dec. 15, 2022

(30) Foreign Application Priority Data

Nov. 14, 2019  (JP) .................................. 2019-205877

(51) Int. Cl.
*B32B 3/12*  (2006.01)
*B32B 5/02*  (2006.01)
(Continued)

(52) U.S. Cl.
CPC .................. *B32B 3/12* (2013.01); *B32B 5/02* (2013.01); *B32B 5/26* (2013.01); *E04C 2/365* (2013.01);
(Continued)

(58) Field of Classification Search
CPC ......... Y10T 428/236; Y10T 428/24149; Y10T 428/24157; Y10T 428/24165;
(Continued)

(56) References Cited

U.S. PATENT DOCUMENTS 2,490,586 A * 12/1949 Embree ..................... E04B 9/34
                                                    403/376
4,917,934 A *  4/1990 Sempolinski ............ G02B 5/08
                                                      65/36
(Continued)

FOREIGN PATENT DOCUMENTS

CN          1657275 A       8/2005
CN      205149038 U  *     4/2016
(Continued)

OTHER PUBLICATIONS

Machine translation (Google Patents) of CN 205149038 U. Translated Jun. 15, 2024. (Year: 2024).*
(Continued)

*Primary Examiner* — Maria V Ewald
*Assistant Examiner* — Ethan A. Utt
(74) *Attorney, Agent, or Firm* — Studebaker & Brackett PC

(57) ABSTRACT

A honeycomb-like core member that can be easily manufactured is disclosed, and a structure using such core member is disclosed. The core member has a plurality of flat plate members (a plurality of first flat plates and a plurality of second flat plates), each of which includes a comb teeth portion that has a plurality of notches, which are open in the long side of a rectangular shape of the flat plate member and extend parallel to the short side of the rectangular shape of the flat plate member. The notches are engaged with each other so that the plate members cross each other, and thus, a plurality of hexagonal-cylinder-shaped first cylinder por- (Continued)

tions and a plurality of triangular-cylinder-shaped second cylinder portions are formed by the plate members.

13 Claims, 8 Drawing Sheets

(51) Int. Cl.
 *B32B 5/26* (2006.01)
 *E04C 2/36* (2006.01)
(52) U.S. Cl.
 CPC ..... *B32B 2250/20* (2013.01); *B32B 2260/023* (2013.01); *B32B 2260/046* (2013.01); *B32B 2262/106* (2013.01)
(58) Field of Classification Search
 CPC ......... Y10T 428/234; B32B 3/10; B32B 3/12; B32B 2305/024; E04C 2/36; E04C 2/365; E04C 2/40; E04C 2/42; E04C 2/421; E04C 2/422; E04C 2/423
 USPC ..... 428/33, 72, 73, 116, 117, 118; 52/783.1, 52/784.14, 793.1; 244/123.13, 123.6
 See application file for complete search history.

(56) References Cited

U.S. PATENT DOCUMENTS

| 2014/0295113 | A1* | 10/2014 | Trautmann | B64C 1/00 |
| | | | | 428/34.1 |
| 2017/0043549 | A1* | 2/2017 | Stute | B32B 27/04 |

FOREIGN PATENT DOCUMENTS

| EP | 0 794 442 | A1 | 9/1997 |
| EP | 3 130 456 | A2 | 2/2017 |
| JP | H02-300701 | A | 12/1990 |
| JP | H08-207180 | A | 8/1996 |
| JP | 2676738 | B2 | 11/1997 |
| JP | 2001-262771 | A | 9/2001 |
| JP | 2008-212787 | A | 9/2008 |

OTHER PUBLICATIONS

An Office Action; "Notice of Reasons for Refusal," mailed by the Japanese Patent Office on Apr. 25, 2023, which corresponds to Japanese Patent Application No. 2019-205877 and is related to U.S. Appl. No. 17/756,026; with English language translation.
An Office Action mailed by China National Intellectual Property Administration on Mar. 21, 2024, which corresponds to Chinese Patent Application No. 202080079117.7 and is related to U.S. Appl. No. 17/756,026; with English translation.
An Office Action mailed by China National Intellectual Property Administration on Jan. 2, 2024, which corresponds to Chinese Patent Application No. 202080079117.7 and is related to U.S. Appl. No. 17/756,026; with English translation.
International Search Report issued in PCT/JP2020/029075; mailed Sep. 8, 2020.
An Office Action mailed by China National Intellectual Property Administration on Aug. 1, 2023, which corresponds to Chinese U.S. Appl. No. 17/756,026.7 and is related to U.S. Appl. No. 17/756,026; with English translation.
The extended European search report issued by the European Patent Office on Nov. 21, 2023, which corresponds to European Patent Application No. 20887381.0-1014 and is related to U.S. Appl. No. 17/756,026.
An Office Action mailed by the Korean Intellectual Property Office on Apr. 17, 2024, which corresponds to Korean Patent Application No. 10-2022-7018880 and is related to U.S. Appl. No. 17/756,026; with English language translation.

* cited by examiner

CORE MATERIAL AND STRUCTURE

TECHNICAL FIELD

The present invention relates to a honeycomb-like core material (core member) and a structure using the core member.

DESCRIPTION OF THE RELATED ART

Conventionally, a honeycomb core, which is an assemblage of hexagonal cells (hexagonal cylinders), is known as a light and strong core member. The honeycomb core is used as a core member in many structures. For example, if plate members are attached to opposite faces of the honeycomb core (i.e., the core member), a combination of the plate members and the honeycomb core becomes a planar or panel-like structure. Such structures are used, for example, in building walls, aircraft bodies, and stages (tables) of large processing equipment.

When the honeycomb core is formed from a plurality of members whose material is paper, aluminum, plastic or the like, the honeycomb core may be manufactured by applying an adhesive linearly onto opposite faces of each of the members, laminating the members to prepare a block-like laminate, cutting the laminate to a desired width and spreading the laminate.

However, when the honeycomb core is made of a carbon-fiber-reinforced plastics (CFRP) having characteristics such as high specific stiffness, a low density and a low coefficient of thermal expansion, the above-described manufacturing method cannot be adopted.

Patent Literature Document 1 (Patent No. 2676738) discloses a core member that includes a large number of cylindrical CFRP pieces arranged side by side and joined with each other by an adhesive. Each of the CRRP pieces has a hollow cylindrical portion. Patent Literature Document 1 also discloses a core member that includes a large number of hexagonal cylindrical CFRP pieces arranged side by side and joined by an adhesive. Each of the CRRP pieces has a hollow cylindrical portion.

LISTING Of REFERENCES

Patent Literature Documents

Patent Literature Document 1: Japanese Patent No. 2676738

SUMMARY OF THE INVENTION

Problems to be Solved by the Invention

In the technique described in Patent Literature Document 1 (Japanese Patent No. 2676738), a CFRP is molded into a cylindrical shape or a hexagonal cylindrical shape, and a large number of molded CFRP cylinders are arranged side by side and bonded to each other. Thus, the manufacturing process is complicated. In addition, a special and dedicated processing machine and a special and dedicated assembling machine are required. Thus, the cost is increased accordingly.

It is an object of the present invention to provide a honeycomb-like core member which can be easily manufactured and a structure using the core member.

Solution to the Problems

In order to achieve the above-mentioned object, one aspect of the present invention provides a core member that includes a plurality of flat plate members, and each of the flat plate members includes a comb-teeth portion. The comb-teeth portion is defined by a plurality of notches formed in each of rectangular plate members such that the notches extend parallel to a short side of the rectangular plate member and open to at least one of long sides of the rectangular plate member. The notches of the flat plate members are engaged with each other such that the flat plate members cross each other and the crossing flat plate members create a plurality of first cylindrical portions each having a hexagonal cylinder shape, and a plurality of second cylindrical portions each having a triangular cylinder shape.

Thus, it is possible to obtain a honeycomb-like core member having a simple configuration by merely intersecting the flat plate members having a comb-teeth portion at the notches. Therefore, it is possible to create the core member in a simple manner without requiring a dedicated processing machine and a dedicated assembling machine. Further, since a portion where two planar segments overlap each other (the portion where the thickness of the wall of the core member is doubled) and a portion where two planar segments do not overlap (the portion where the single planar member extends alone) are not mixed in the core member, the mechanical properties and thermal characteristics in a plane perpendicular to the thickness direction of the core member are equalized. Therefore, distortion of the core member due to temperature change or the like can be suppressed or avoided.

The notches of the core member may be engaged with each other such that the flat plate members cross each other at an angle of 60 degrees.

In this configuration, the first cylindrical portions become the hexagonal cylindrical portions, each of which has an equilateral hexagonal shape, and the second cylindrical portions become the triangular cylindrical portions, each of which as an equilateral triangular shape. Therefore, the core member possesses excellent stability.

In the core member, the flat plate members having the comb-teeth portions may include a plurality of first flat plate members, each of which has the notches open to one of the long sides of the rectangular plate member at equal intervals and may also include a plurality of second flat plate members, each of which has the notches open to one of the long sides of the rectangular plate member at equal intervals and the notches open to the other of the long sides of the rectangular plate member at the equal intervals. The notches open to the other of the long sides of the second flat plate members may be shifted from the notches open to the above-mentioned one of the long sides of the second flat plate members at a half of the interval.

In this configuration, it is possible to constitute the honeycomb-like core member from only two types of flat plate members.

A length (depth) of each of the notches in the core member may be longer than a half of a length of the short side of the rectangular plate member.

In this configuration, a gap can be formed in the vicinity of each of the notches when the flat plate members are engaged with each other. In other words, the inside of each of the first cylindrical portions and the inside of each of the second cylindrical portions are not hermetically sealed. Thus, it is possible to impart air permeability (breathability) to the cylindrical portions, and to suppress the distortion that would occur in the core member due to the pressure change inside the cylindrical portions upon temperature change.

A width of each of the notches may be set to a value that forms a gap in the vicinity of each of the notches when the flat plate members are engaged with each other.

This configuration also prevents the inside of the first cylindrical portion and the second cylindrical portion from being sealed. Thus, it is possible to suppress the distortion that would occur in the core member due to the pressure change inside the cylindrical portions upon temperature change. Further, when the flat plate members are engaged with each other, it is possible to prevent the flat plate members from bending at the notches.

Each of the flat plate members of the core member may be made of a carbon fiber reinforced plastic in which a plurality of prepregs are laminated. In this configuration, the honeycomb-like core member has characteristics of the carbon fiber reinforced plastics (CFRP) such as high specific stiffness, a small density and a small coefficient of thermal expansion.

Fibers of the carbon fiber reinforced plastic of the core member may extend in a direction parallel to the short side of the flat plate member. This configuration can prevent fluctuation (strain) to the short side of the flat plate member due to temperature change.

The carbon fiber reinforced plastic of the core member may be a cross-ply laminate. In this configuration, it is possible to impart isotropy in a pseudo manner.

According to another aspect of the present invention, there is provided a method of manufacturing a core member having a plurality of hexagonal-cylinder-shaped first cylindrical portions and a plurality of triangular-cylinder-shaped second cylindrical portions. The method includes preparing a plurality of flat plate members, each of which includes a comb-teeth portion such that the comb-teeth portion has a plurality of notches that are open to at least one of long sides of a rectangular plate member and extend parallel to a short side of the rectangular plate member. The method also includes engaging the notches with each other such that the flat plate members cross each other.

In this manner, the honeycomb-like core member can be manufactured by simply crossing and combining the flat plate members having the comb-teeth portions at the notches. That is, it is possible to create the core member in a simple manner without requiring a dedicated processing machine and a dedicated assembling machine.

According to still another aspect of the present invention, there is provided a structure that includes the above-described core member and plate members bonded to opposite faces of the core member.

Thus, it is possible to make a structure using the honeycomb-like core member, which is easy to manufacture. Since the mechanical properties and thermal characteristics of the core member in a plane perpendicular to the thickness direction are uniform, the resulting structure can suppress distortions due to temperature change or the like.

Advantages of the Invention

According to the present invention, it is possible to provide a honeycomb-like core member which can be easily manufactured without requiring a dedicated processing machine and a dedicated assembling machine.

The above-mentioned objects, aspects and advantages of the present invention and other objects, aspects and advantages of the present invention will be understood by those skilled in the art from the following detailed description of the invention by referring to the accompanying drawings and the appended claims.

DETAILED DESCRIPTION OF THE EMBODIMENTS

Embodiments of the present invention will be described below with reference to the drawings.

Figure 1:
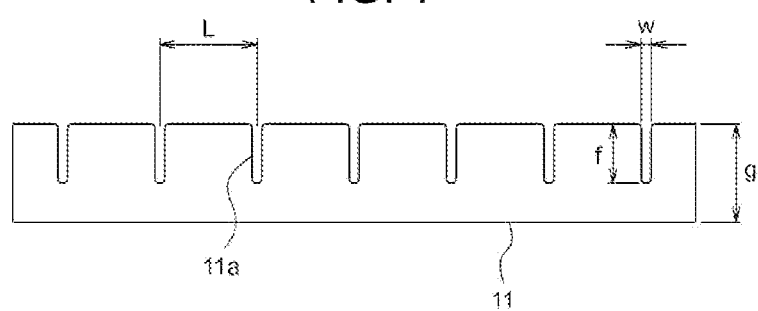
FIG. 1 shows a first flat plate of a core member according to an embodiment of the present invention.
Figure 2:
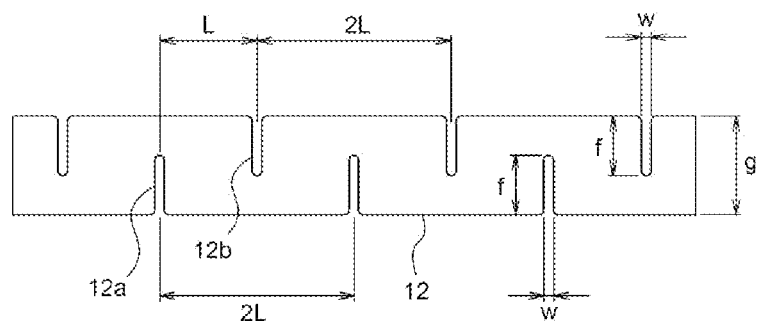
FIG. 2 shows a second flat plate of the core member according to the embodiment of the present invention.

In this embodiment, a honeycomb-like core member in which two types of plate members shown in FIGS. 1 and 2 are assembled will be described.

FIG. 1 shows a first flat plate 11 which is a plate member of a honeycomb-like core member of this embodiment. FIG. 2 shows a second flat plate 12 which is another plate member of the honeycomb-like core member of this embodiment.

As shown in FIG. 1, the first flat plate 11 is a rectangular plate member and has a plurality of notches or cutouts 11$a$, each of which is open to one of long sides (upper long side in FIG. 1) of the rectangular plate. Thus, the first flat plate 11 is a comb-shaped member (having comb teeth on one side) and each of the notches 11$a$ extends parallel to the short side of the rectangular plate. The notches 11$a$ are formed at equal intervals L in the long side direction. The length (depth) f of each of the notches 11$a$ is slightly longer than a half of the length g of the short side. The width w of the notch 11$a$ is greater than the thickness of the first flat plate 11. The interval L may be referred to as a pitch of the notches 11$a$.

As shown in FIG. 2, the second flat plate 12 is a rectangular plate member and has a plurality of lower notches 12$a$, each of which is open to one of the long sides (lower long side in FIG. 2) of the rectangular plate and a plurality of upper notches 12$b$, each of which is open to the other long side (upper long side) of the rectangular plate. Each of the notches 12$a$ extends parallel to the short side of the rectangular plate. Each of the notches 12$b$ extends parallel to the short side of the rectangular plate. Thus, the second flat plate 12 is another comb-shaped member (having comb teeth on both sides).

In the second flat plate 12, the notches 12$a$ are formed at equal intervals 2L in the long side direction, and the notches 12$b$ are formed at equal intervals 2L in the long side direction. The interval 2L may be referred to as a pitch of the notches 12$a$ (or 12$b$). The notches 12$a$ and the notches 12$b$ are shifted from each other by a half of the interval 2L in the long side direction. In other words, the notches 12$a$ and the notches 12$b$ are alternately formed at the constant distance L the long side direction. The length f and the width w of each of the notches 12a is equal to the length f and the width w of the notch 11a of the first flat plate 11.

The thickness of the first flat plate 11 is equal to the thickness of the second flat plate 12. The thicknesses of each of the first flat plate 11 and the second flat plate 12 may be set to a value (e.g., 1 mm or more) that enables each of the first flat plate 11 and the second flat plate 12 to stand alone. The thickness of each of the first flat plate 11 and the second flat plate 12 may be appropriately set depending on the strength required.

The first flat plate 11 and the second flat plate 12 may be made of carbon fiber reinforced plastics (CFRP).

A CFRP plate is formed by stacking a plurality of prepregs. The prepreg is a sheet-like member in which a carbon fiber is impregnated with a resin while maintaining directionality of fibers. The resin in the prepreg is, for example, a thermosetting epoxy resin. It should be noted that the resin in the prepreg is not limited to the thermosetting epoxy resin, i.e., the resin may be, for example, a thermosetting resin such as an unsaturated polyester, a vinyl ester, a phenol, a cyanate ester, or a polyimide.

The CFRP plate is formed by laminating a plurality of layers of prepregs (e.g., 8 layers to 24 layers of prepregs) in a mold such that the fibers are arranged in different directions, heating the laminate of the prepreg layers to about 120 degree C. to 130 degrees C. under reduced pressure, and pressurizing (pressure-bonding) the laminate of the prepreg layers to cure the laminate. The prepreg may be, for example, a UD (Uni-Direction) material. The UD material is a material in which the direction of the fiber extends in only one direction.

The CFRP plate, which is the first flat plate 11 and the second flat plate 12, may be a cross-ply laminate (multilayer plate) which the prepregs are laminated, with the fibers extending in a 0-degree direction and the fibers extending in a 90-degree direction being alternately laminated. The CFRP plate may be a symmetrical cross-ply laminate in which the laminate is vertically symmetrical with respect to a center plane (upper half has a mirror symmetry of a lower half). In FIGS. 1 and 2, one of the directions of the fibers is the vertical direction and the other direction is the horizontal direction.

The CFRP plate prepared in the above-mentioned manner is a plate material that is less dense (i.e., lighter) than metallic materials such as iron and aluminum, but yet has a higher strength. In addition, this plate material is quasi-isotropic.

A plurality of first flat plates 11 and a plurality of second flat plates 12 are prepared in this embodiment. Then, the first flat plates 11 and the second flat plates 12 are assembled by engaging the notches 11a of the first flat plates 11 with the notches 12a of the second flat plates 12 such that the first flat plates 11 and the second flat plates 12 intersect with each other. Thus, the assemblage of the first flat plates 11 and the second flat plates 12 creates a honeycomb-like core member that includes a plurality of hexagonal cylindrical portions (first cylindrical portions) and a plurality of triangular cylindrical portions (second cylindrical portions).

A process of assembling the first and second flat plates to obtain the core member of this embodiment will now be described in detail.

This embodiment will describe a structure in which the flat plates 11 and 12 are engaged with each other at an angle of 60 degrees such that the equilateral hexagonal cylinder portions and the equilateral triangular cylinder portions are created in the honeycomb-like core member.

First Step

Figure 3:
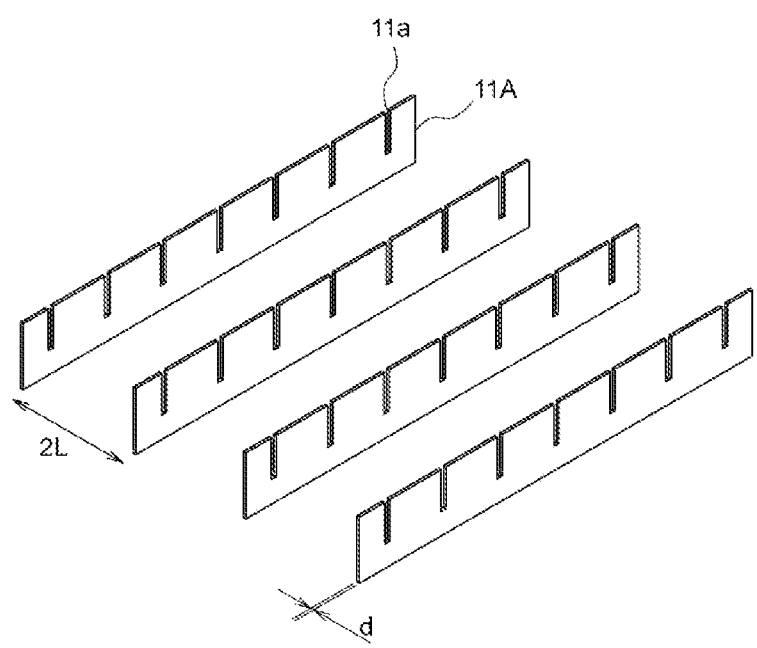
FIG. 3 is a diagram useful to describe a first step of assembling the core member.

As shown in FIG. 3, a plurality of first flat plates 11 with the openings of e notches 11a facing upward (hereinafter referred to as "first flat plates 11A") are arranged in parallel to each other. The first flat plates 11A are spaced from each other at predetermined distances 2L (twice the pitch of the notches 11a) in the direction of 60 degrees with respect to the plane of the first flat plate 11A. The first flat plates 11A are arranged side by side in parallel.

Second Step

Figure 4:
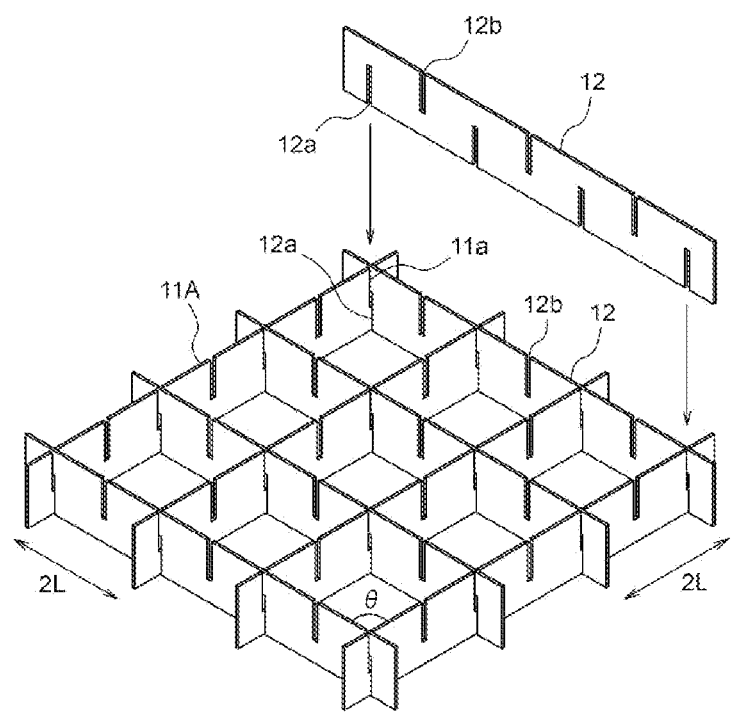
FIG. 4 is a diagram useful to describe a second step of assembling the core member.

As shown in FIG. 4, a plurality of second flat plates 12 are engaged with the first flat plates 11A arranged in the first step. Specifically, the notches 12a which open to the lower sides of the second flat plates 12 are fitted in the notches 11a of the first flat plates 11A. It should be to be noted that the first flat plates 11A and the second flat plates 12 are not bonded to each other (the interfaces between the first and second flat plates are free of adhesives) in the second step.

The second flat plates 12 spaced from each other at the predetermined distances 2L in the direction of 60 degrees with respect to the plane of the second flat plate 12, and are arranged side by side in parallel. In FIG. 4, the intersecting angle θ between the first flat plate 11A and the second flat plate 12 is 60 degrees.

The notches 12a of the second flat plates 12 are inserted into every other one of the notches 11a of each of the first flat plates 11A.

Third Step

Figure 5:
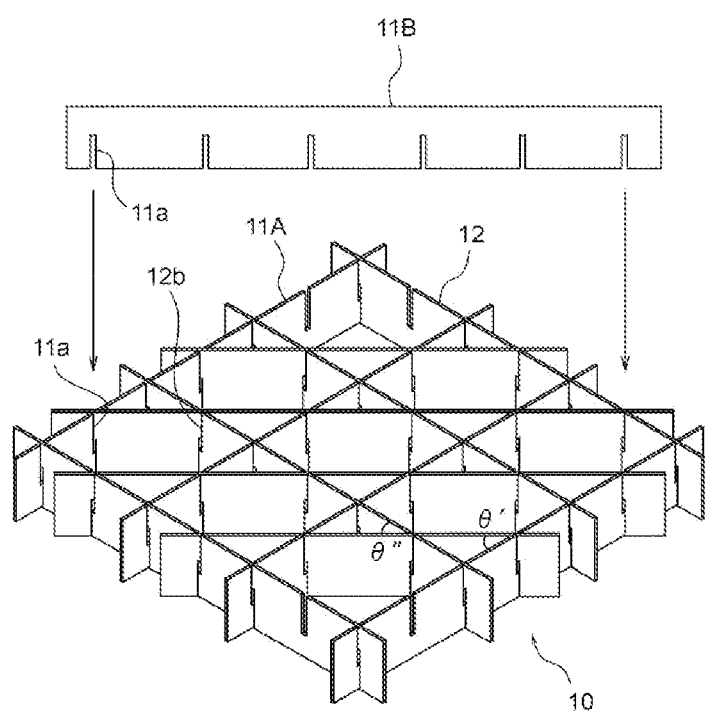
FIG. 5 is a diagram useful to describe a third step of assembling the core member.

As shown in FIG. 5, a plurality of first flat plates 11 with the openings of notches 11a facing downward (hereinafter referred to as "first flat plates 11B") are engaged with the first flat plates 11A and the second flat plates 12 assembled in the second step. Specifically, the notches 11a of the first flat plates 11B are fitted in the empty notches 11a of the first flat plates 11A, which have not yet received the second flat plates 12, and the notches 12b, which open to the upper sides of the second flat plates 12. The first flat plates 11A and the first flat plates 11B are not bonded to each other and the second flat plates 12 and the first flat plates 11B are not bonded to each other.

The first flat plates 11B are spaced from each other at the predetermined distances 2L in the direction of 60 degrees with respect to the plane of the first flat plate 11B. The first flat plates 11B are arranged side by side in parallel. In FIG. 5, the intersecting angle θ' between the first flat plate 11A and the first flat plate 11B is 60 degrees and the intersecting angle θ" between the second flat plate 12 and the first flat plate 11B is also 60 degrees.

In this manner, the honeycomb-like core member 10 is manufactured.

As described above, the first flat plates 11 shown in FIG. 1 are used in the first step and the third step in the assembling process for the core member 10. On the other hand, the second flat plates 12 shown in FIG. 2 are used only in the second step. Therefore, the number of the first flat plates 11 used for the core member 10 is greater than the number of the second flat plates 12.

Figure 6:
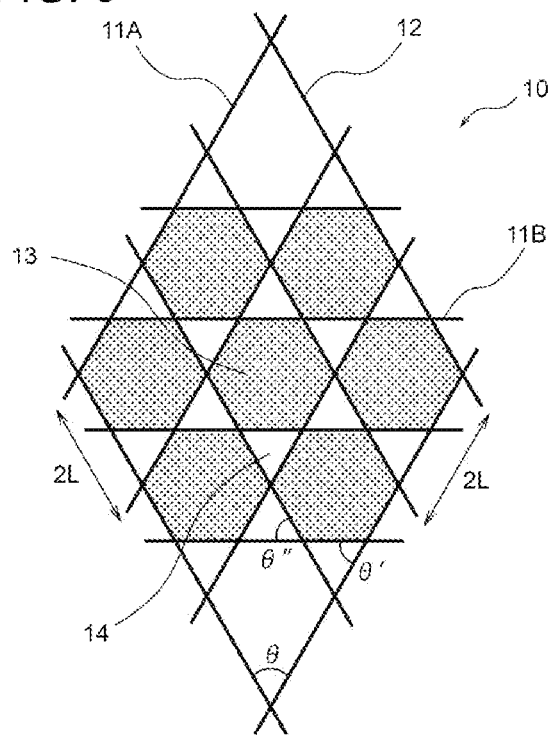
FIG. 6 is a plan view of the core member.

FIG. 6 is a plan view of the honeycomb-like core member 10 of this embodiment.

As shown in FIG. 6, the core member 10 includes the first flat plates 11A and 11B and the second flat plates 12. The notches of these flat plates are engaged with each other such that the flat plates intersect each other at an angle of 60 degrees. In the core member 10, therefore, a plurality of hexagonal cylindrical portions (regular hexagonal cells) 13 and a plurality of triangular cylindrical portions (equilateral triangular cells) 14 are defined by the first flat plates 11A and 11B and the second flat plates 12.

A conventional (or ordinary) honeycomb core, when viewed from the top (in a plan view), is an assemblage of regular hexagonal cells (equilateral hexagonal cells). On the other hand, the core member 10 of this embodiment, has a configuration in which the cells of the equilateral triangle are arranged around the cells of the equilateral hexagon. Therefore, the core member 10 of this embodiment is not called a true honeycomb core, but a honeycomb-like core (a quasi honeycomb core). However, the core member 10 can have the same strength as that of an ordinary honeycomb core.

Since the core member 10 of this embodiment is constituted by CFRP, the core member 10 can be a honeycomb-like core member having CFRP properties such as high specific stiffness, a small density and a small thermal expansion coefficient.

Figure 7A:
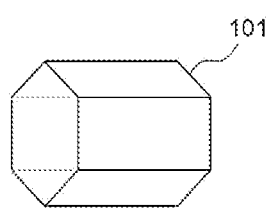
FIG. 7($a$) and FIG. 7($b$) are a set of diagrams useful to describe a conventional method of manufacturing a core member.
Figure 7B:
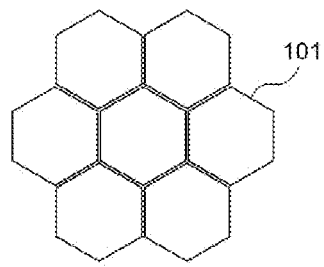

When an ordinary honeycomb core is made from CFRP, a plurality of hexagonal cylindrical CFRP members 101 as shown in FIG. 7(*a*) are used in a manufacturing method. Specifically, the CRRP members 101 are arranged side by side without a gap and bonded to each other as shown in FIG. 7(*b*). However, this manufacturing method requires a step of forming a CFRP member to a hexagonal cylindrical shape, a step of preparing and arranging a large number of CFRP members 101 and a step of bonding the CFRP members. This manufacturing method is complicated.

When making a panel or a planar stage (flat stage) as a structure that has a honeycomb core as a core member, a plate member is bonded to the top of the core member and another plate member is attached (bonded) to the bottom of the core member. As a result, the inside of each of the hexagonal cylindrical portions of the honeycomb core will be completely sealed by the plate members. In general, a thermosetting adhesive is used for attaching the plate members to the core member, and the honeycomb core is heated at the time of attaching the plate members. If the interior of the honeycomb core is sealed (closed), a pressure difference arises between the inside and the outside of the sealed space upon finishing the attachment of the plate members and lowering the temperature. This pressure difference may cause distortions to occur in the structure. Furthermore, even during use of the structure, the above-mentioned pressure difference arises as the environmental temperature changes. This may also cause distortions to occur in the structure.

To prevent the inside of the first cylindrical portion and the second cylindrical portion from being sealed, the walls of the hexagonal cylinder portions need to have openings that communicate to the outside for leakage of the inside air to the outside. This makes the manufacturing process further complicated.

Figure 8A:
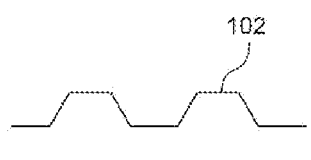
FIG. 8($a$) and FIG. 8($b$) are a set of diagrams useful to describe another conventional method of manufacturing a core member.
Figure 8B:
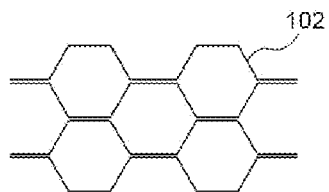

When making an ordinary honeycomb core from CFRP, there is another method: a CFRP member 102 is bent at a plurality of positions with equal intervals as shown in FIG. 8(*a*) such that the CFRP member 102 has a zigzag shape, and a plurality of such CFRP members are prepared. Then, the CFRP members 102 are partially bonded as shown in FIG. 8(*b*) to form a plurality of hexagonal cylinder portions.

In order to bend the plate member at equal intervals as shown in FIG. 8(*a*), however, a special processing device is required. Further, similar to the honeycomb core shown in FIG. 7(*b*), it is necessary to make holes that allow the air to leak to the outside.

Figure 9:
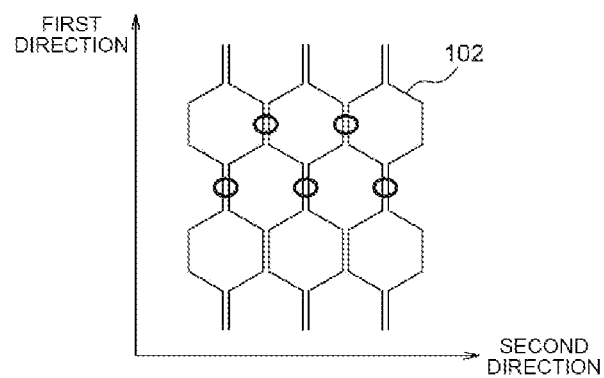
FIG. 9 shows those portions which have different wall thicknesses in a conventional honeycomb core.

The honeycomb core created by bonding the CFRP members 102 as shown in FIG. 8(*b*) includes a mixture of portions where the thickness of the wall of the honeycomb core is doubled because two planar segments of the CFRP members are bonded to each other (the segments indicated by the circle in FIG. 9) and portions where the thickness of the wall is unchanged because a single planar segment of the CFRP member exists, as shown in FIG. 9. If the direction parallel to the wall whose thickness becomes double (ribbon direction) is referred to as a first direction and the direction perpendicular to the first direction is referred to as a second direction, the mechanical properties and thermal properties of the honeycomb core, such as the strength, rigidity and thermal expansion coefficient, in the first direction are different from those in the second direction.

This will become a problem when the honeycomb core is used, for example, as a core member of a stage of a processing machine to which processing precision is required. This is because there is a possibility that distortion may occur on the stage surface due to a force applied to the stage, a temperature change of the environment in which the device is placed, or the like.

On the other hand, the core member 10 of this embodiment is constructed by engaging the notches of the comb-teeth-shaped flat plates with each other such that the flat plates intersect each other. Therefore, the core member does not have a portion (or portions) where the flat segments overlap. In each of the portions where the flat plates 11A, 11B and 12 intersect (i.e., the notches of the flat plates), the flat plates are in contact with each other, but they are in partial contact, and the flat plates are not firmly fixed to each other by an adhesive or the like.

Therefore, unlike the honeycomb core shown in FIG. 8(*b*), the core member of this embodiment has no anisotropy in mechanical and thermal characteristics, i.e., the mechanical and thermal characteristics of the core member in the first direction are the same as those in the second direction. Thus, it is possible to suppress or avoid the generation of distortions due to a temperature change or the like.

In addition, the core member 10 of this embodiment can be manufactured by simply fitting the notches of the comb-shaped flat plates into the notches of the comb-shaped flat plates. Therefore, a special and dedicated processing machine and/or a special and dedicated assembling machine is unnecessary, and accordingly, the core member of this embodiment can be produced at low cost.

The length f of the notch formed in the flat plate 11, 12 is longer than a half of the length g of the short side of the flat plate. As a result, a gap can be formed at (or in the vicinity of) every intersecting portion of every two flat plates (at the engaging portion of every two notches of every two flat plates). This gap serves as the above-described hole for leakage of the air to the outside. That is, the notches formed to allow the flat plates to intersect each other also serve as the holes for leakage of the air to the outside. Therefore, even when the plate members are attached to the top and bottom of the core member 10, the inside of each of the hexagonal cylindrical portions 13 and the inside of each of the triangular cylindrical portions 14 of the core member 10 are not sealed from the outside. Therefore, the step of forming holes for air leakage is not required. This reduces the production time of the core member 10 and contributes to the cost reduction of the core member 10.

The width w of the notch 11*a*, 12*a*, 12*b* formed in the flat plate is greater than the thickness of the flat plate. Specifically, the width w of the notch is set to a value that allows a gap to be left at the interface between every two engaged notches of every two flat plates when the two flat plates are engaged with each other at the predetermined angle. Every two flat plates are engaged with each other at the intersecting angle of 60 degrees in this embodiment, and therefore the width w of each of the notches is set to a sum of a first value and a second value. The first value allows the two flat plates to engage with each other at the angle of 60 degrees the first value is decided based on the thickness of the flat plate (design value of the flat plate) d and the intersecting angle θ (60 degrees) of the plates). The second value is predetermined play (margin). The play is preferably set in consideration of a manufacturing error or tolerance of the thickness of the flat plate.

If the width w of the notch is too large (if the play is too large), the initial posture of the flat plate at the time of assembling the flat plates becomes oblique, and accordingly the resulting core member would become easy to buckle or collapse. Therefore, it is preferable that the play of the width w of the notch is set to a small value to such an extent that the buckling does not occur, i.e., to such an extent that the initial posture of the flat plate does not become oblique.

As described above, the core member 10 of this embodiment is a honeycomb-like core member that has the uniform (same) mechanical properties and thermal characteristics in a plane perpendicular to the thickness direction, does not require a special processing machine and does not need a machining step for making air leakage holes.

Figure 10:
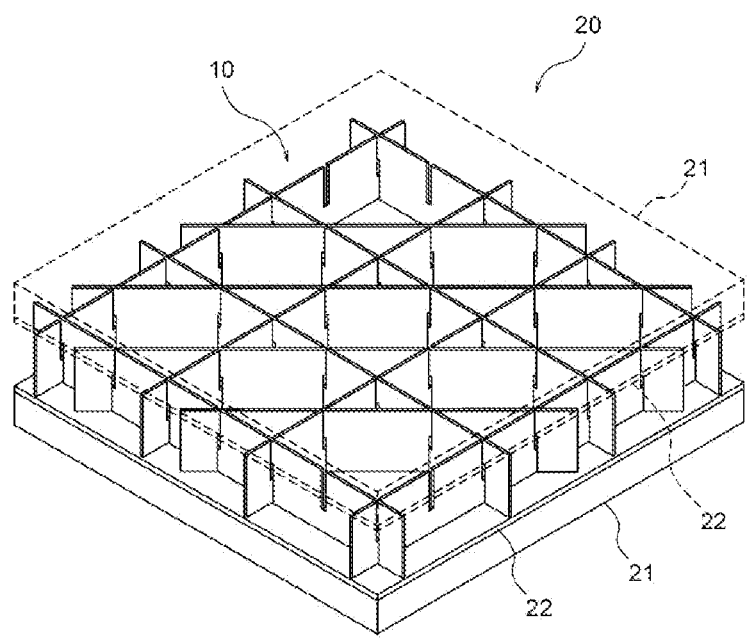
FIG. 10 shows a structure using the core member according to the embodiment of the present invention.

The core member 10 of this embodiment can be used as a core member of various structures. For example, as shown in FIG. 10, two plate members 21 may be disposed to sandwich the core member 10 from above and below and bonded to the top and bottom of the core member 10 with bonding members 22 to obtain a panel-like structure 20.

Each of the bonding members (adhesive members) 22 may be a sheet-like adhesive or a liquid adhesive. It is desirable that the core member 10 and the plate members 21 are made of the same material. By using the same material, the thermal expansion coefficient of the core member 10 becomes equal to the thermal expansion coefficient of the plate member 21, and therefore it is possible to suppress or avoid the distortion of the structure 20 due to temperature changes.

If the material of the core member 10 is CFRP and the material of the plate members 21 is also CFRP, it is possible to make a strong panel-shaped structure 20 that has light weight and generates small thermal deformation (small thermal expansion).

CFRP has a small coefficient of thermal expansion in the direction parallel to the fiber and a small fluctuation (strain) due to heat, in the direction parallel to the fiber. Therefore, if the direction of the fibers of CFRP is aligned with a direction parallel to the short side of each of the flat plates of the core member 10, it is possible to prevent surface fluctuations (deformations and/or strains) in a direction perpendicular to the surface of the plate member 21, which would otherwise be caused by temperature changes.

In this embodiment, the CFRP plate that constitutes each of the flat plates of the core member 10 is a cross-ply laminate (multilayer plate) in which the prepregs are laminated such that the directions of the fibers of the prepregs become the angle of 0 degree and the angle of 90 degrees alternately. It should be noted, however, that the present invention is not limited to such configuration. For example, the directions of the fibers in the cross-ply laminate may also include an angle of 45 degrees (intermediate angle) and/or an angle of 60 degrees (another intermediate angle) in addition to the angle of 0 degree and the angle of 90 degrees. Use of such laminate of CFRP gives the core member 10 the isotropy in terms of the stiffness and expansion/contraction. Thus, the core member 10 may be used in various applications and structures.

Such structure 20 may be used, for example, as building walls, aircraft bodies, space equipment, stages of large processing machines, and the like.

Modifications

Although the hexagonal cylindrical portions 13 having the equilateral hexagonal shape and the triangular cylindrical portions 14 having the equilateral triangular shape are formed in the core member 10 of the above-described embodiment, each of the hexagonal cylindrical portions 13 is not limited to the equilateral hexagonal shape and each of the triangular cylindrical portions 14 is not limited to the equilateral triangular shape.

Figure 11:
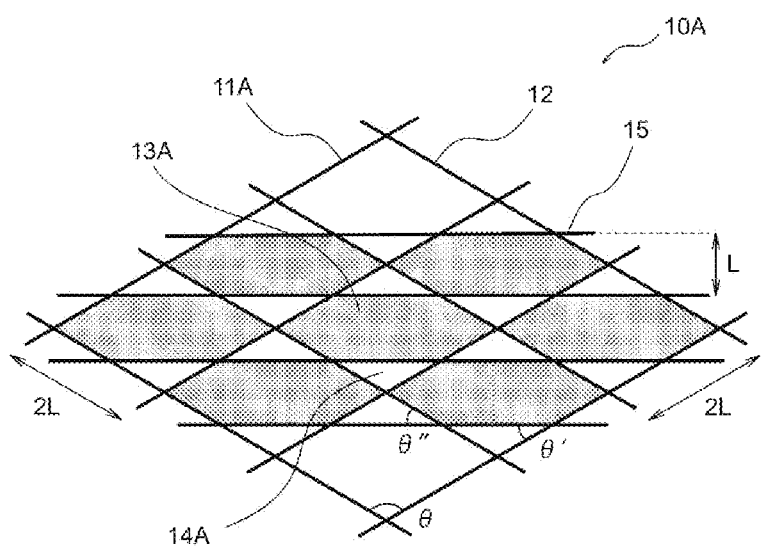
FIG. 11 is a plan view showing an exemplary core member according to another embodiment of the present invention.

For example, as shown in FIG. 11, a core member 10A may have hexagonal cylindrical portions 13A and triangular cylindrical portions 14A. The core member 10A shown in FIG. 11 includes a plurality of first flat plates 11A, a plurality of second flat plates 12, and a plurality of third flat plates 15. The third flat plate 15 has the same configuration as the first flat plate 11B except for the distance (pitch) between every two adjacent notches. In the core member 10A, the intersecting angle θ between the first flat plate 11A and the second flat plate 12 is 120 degrees, the intersecting angle θ' between the first flat plate 11A and the third flat plate 15 is 30 degrees, and the intersecting angle θ" between the second flat plate 12 and the third flat plate 15 is 30 degrees. The distance between every two adjacent third flat plates 15 is denoted by L.

Although a plurality of flat plates are engaged with each other such that the flat plates cross each other at the angle of 60 degrees in the above-described embodiment, the intersecting angle of the flat plates is not limited to the above-mentioned angle, i.e., it can be any suitable angle. It should be noted, however, that if the flat plates are engaged with each other such that the flat plates cross at the angle of 60 degrees, the core member has excellent stability, which is preferable.

Although the honeycomb-like core member 10 is formed using two types of flat plates in the above-described embodiment, three or more types of flat plates may be used to form the honeycomb-like core member.

Although the notches of the second flat member 12 are formed at equal intervals (pitches) and shifted from each other by a half of the pitch in the above-described embodiment, the notches of the second flat member may not be formed at equal intervals and/or may not be shifted from each other by a half of the pitch. In such configurations, the cross-sectional shapes of the triangular cylindrical portions made around the hexagonal cylindrical portions have the different sizes from those shown in FIG. 6. Even if there is a certain difference in the size of each of the triangular cylindrical portions, there is no problem in the strength of the core member.

While specific embodiments have been described above, the embodiments are illustrative only and are not intended to limit the scope of the invention. The apparatus and method described herein may be embodied in other forms than as described above. In addition, it is also possible to appropriately make omissions, replacements (substitutions), and alterations to the above-described embodiment without departing from the scope of the present invention. Embodiments that include such omissions, substitutions and alterations may also fall within the scope of the appended claims end/or their equivalents, i.e., they fall within the technical scope of the present invention.

REFERENCE NUMERALS

10 Core member
11 (11A, 11B) First flat plate
11a Notch
12 Second flat plate
12a, 12b Notch
13 Hexagonal cylindrical portion (first cylindrical portion)
14 Triangular cylindrical portion (second cylindrical portion)
15 Third flat plate
20 Structure
21 Plate member
22 Adhesive member

What is claimed is:

1. A core member comprising a plurality of flat plate members, each of said plurality of flat plate members having a rectangular shape, each of said plurality of flat plate members including a comb-teeth portion, the comb-teeth portion being defined by a plurality of notches formed in each of said plurality of flat plate members such that the plurality of notches extend parallel to a short side of the rectangular shape and open to at least one of long sides of the rectangular shape,
   wherein said plurality of notches of the plurality of flat plate members are engaged with each other such that the plurality of flat plate members cross each other and the crossing flat plate members create a plurality of first cylindrical portions each having a hexagonal cylinder shape, and a plurality of second cylindrical portions each having a triangular cylinder shape, and
   wherein a width of each of the notches is set to a value that forms a gap in the vicinity of each of the notches when the flat plate members are engaged with each other.

2. The core member according to claim 1, wherein the plurality of notches are engaged with each other such that the plurality of flat plate members cross each other at an angle of 60 degrees.

3. The core member according to claim 2, wherein the plurality of flat plate members including the comb-teeth portions has:
   a plurality of first flat plate members, each of which has the plurality of notches open to one of the long sides of the rectangular shape at equal intervals; and
   a plurality of second flat plate members, each of which has the plurality of notches open to said one of the long sides of the rectangular shape at equal intervals and the plurality of notches open to the other of the long sides of the rectangular shape at the equal intervals, the plurality of notches open to the other of the long sides being shifted from the plurality of notches open to said one of the long sides at a half of said interval.

4. The core member according to claim 2, wherein a length of each of the notches is longer than a half of a length of the short side of the rectangular shape.

5. The core member according to claim 2, wherein each of the flat plate members is made of a carbon fiber reinforced plastic in which a plurality of prepregs are laminated.

6. A structure comprising:
   the core member according to claim 2; and
   plate members bonded to opposite faces of the core member.

7. The core member according to claim 1, wherein the plurality of flat plate members including the comb-teeth portions has:
   a plurality of first flat plate members, each of which has the plurality of notches open to one of the long sides of the rectangular shape at equal intervals; and
   a plurality of second flat plate members, each of which has the plurality of notches open to said one of the long sides of the rectangular shape at equal intervals and the plurality of notches open to the other of the long sides of the rectangular shape at the equal intervals, the plurality of notches open to the other of the long sides being shifted from the plurality of notches open to said one of the long sides at a half of said interval.

8. The core member according to claim 1, wherein a length of each of the notches is longer than a half of a length of the short side of the rectangular shape.

9. The core member according to claim 1, wherein each of the flat plate members is made of a carbon fiber reinforced plastic in which a plurality of prepregs are laminated.

10. The core member according to claim 9, wherein fibers of the carbon fiber reinforced plastic extend in a direction parallel to the short side of the rectangular shape.

11. The core member of claim 9, wherein the carbon fiber reinforced plastic is a cross-ply laminate.

12. A structure comprising:
   the core member according to claim 1; and
   plate members bonded to opposite faces of the core member.

13. A method of manufacturing a core member having a plurality of hexagonal-cylinder-shaped first cylindrical portions and a plurality of triangular-cylinder-shaped second cylindrical portions, the method comprising:
   preparing a plurality of flat plate members, each of said plurality of flat plate members having a rectangular shape and including a comb-teeth portion such that the comb-teeth portion has a plurality of notches that are open to at least one of long sides of a rectangular shape and extend parallel to a short side of the rectangular shape; and
   engaging the notches with each other such that the plurality of flat plate members cross each other;
   wherein a width of each of the notches is set to a value that forms a gap in the vicinity of each of the notches when the flat plate members are engaged with each other.

* * * * *